US011039187B2

(12) United States Patent
Jiang

(10) Patent No.: US 11,039,187 B2
(45) Date of Patent: Jun. 15, 2021

(54) SELF-ADAPTIVE SOFTWARE BACKGROUND UPDATE METHOD AND DEVICE

(71) Applicant: SHENZHEN TCL NEW TECHNOLOGY CO., LTD, Guangdong (CN)

(72) Inventor: Zhongyang Jiang, Guangdong (CN)

(73) Assignee: SHENZHEN TCL NEW TECHNOLOGY CO., LTD, Shenzhen (CN)

(*) Notice: Subject to any disclaimer, the term of this patent is extended or adjusted under 35 U.S.C. 154(b) by 117 days.

(21) Appl. No.: 16/319,473

(22) PCT Filed: Dec. 28, 2016

(86) PCT No.: PCT/CN2016/112704
§ 371 (c)(1),
(2) Date: Jan. 21, 2019

(87) PCT Pub. No.: WO2018/036057
PCT Pub. Date: Mar. 1, 2018

(65) Prior Publication Data
US 2020/0204836 A1 Jun. 25, 2020

(30) Foreign Application Priority Data
Aug. 22, 2016 (CN) .......................... 201610698777.9

(51) Int. Cl.
*H04N 21/239* (2011.01)
*G06F 8/65* (2018.01)
(Continued)

(52) U.S. Cl.
CPC ........... *H04N 21/2393* (2013.01); *G06F 8/65* (2013.01); *G06F 9/445* (2013.01); *H04L 29/08* (2013.01);
(Continued)

(58) Field of Classification Search
CPC ........... H04N 21/4332; H04N 21/4331; H04N 21/2393; H04N 21/44209; G06F 8/65; G06F 16/739; H04L 29/08; H04L 69/163
See application file for complete search history.

(56) References Cited

U.S. PATENT DOCUMENTS

2006/0174306 A1* 8/2006 Kim ...................... H04N 21/235
725/132
2007/0094694 A1* 4/2007 Choi ................... H04N 7/17318
725/93
(Continued)

FOREIGN PATENT DOCUMENTS

CN 101964974 A 2/2011
CN 102791032 A 11/2012
(Continued)

OTHER PUBLICATIONS

Luiz Fernando Gomes Soares et al., "Ginga-NCL: Declarative Middleware for Multimedia IPTV Services", [Online], pp. 74-81, [Retrieved from Internetr on Apr. 6, 2021, <https://ieeexplore.IEEE.org/stamp/stamp.jsp?arnumber=5473867> (Year: 2010).*
(Continued)

*Primary Examiner* — Ziaul A Chowdhury

(57) ABSTRACT

The present application relates to a self-adaptive software background update method and device. The method includes: monitoring a TCP download request in a system, after the system starts up; filtering a download request of a network video and a download request of a system update software from the TCP download request, when the download request of the network video and the download request of the system update software exist simultaneously in the TCP download request; downloading and playing the network video under a TCP link according to the download request of the network video, and obtaining a data cache amount of the network video; starting up downloading the
(Continued)

system update software according to the download request of the system update software; controlling a download rate of system update.

5 Claims, 3 Drawing Sheets

(51) Int. Cl.
    *H04L 29/08*     (2006.01)
    *H04L 29/06*     (2006.01)
    *H04N 21/433*     (2011.01)
    *H04N 21/442*     (2011.01)
    *G06F 9/445*     (2018.01)

(52) U.S. Cl.
    CPC ....... *H04L 69/163* (2013.01); *H04N 21/4331* (2013.01); *H04N 21/44209* (2013.01)

(56) References Cited

U.S. PATENT DOCUMENTS

| | | | |
|---|---|---|---|
| 2008/0288611 A1 | 11/2008 | Toyomura et al. | |
| 2012/0323986 A1* | 12/2012 | Sayko | H04L 47/10 709/201 |
| 2015/0089577 A1* | 3/2015 | Beckman | G06F 21/10 726/1 |
| 2015/0244636 A1* | 8/2015 | Zhou | H04N 21/44004 709/233 |
| 2016/0344608 A1* | 11/2016 | Siemens | H04L 43/12 |
| 2017/0195450 A1* | 7/2017 | Su | H04N 21/26291 |

FOREIGN PATENT DOCUMENTS

| | | |
|---|---|---|
| CN | 104572144 A | 4/2015 |
| CN | 104954286 A | 9/2015 |
| CN | 104965730 A | 10/2015 |
| EP | 2293644 A1 | 3/2011 |

OTHER PUBLICATIONS

Eduard Turcan et al., "Intelligent Software Delivery Using P2P", [Online], pp. 1-8, [Retrieved from Internet on Apr. 6, 2021], <https://ieeexplore.IEEE.org/stamp/stamp.jsp?arnumber=1046323> (Year: 2002).*

Raime Bustos et al., "Multicast-P2P Content Distribution in Large-Scale Enterprise Networks", [Online], pp. 487-494, [Retrieved from Internet on Apr. 6, 2021], <https://ieeexplore.IEEE.org/stamp/stamp.jsp?arnumber=4625722> (Year: 2008).*

Search Report of counterpart European Patent Application No. 16914077.9 dated Dec. 18, 2019.

International Search Report of PCT Patent Application No. PCT/CN2016/112704 dated May 31, 2017.

\* cited by examiner

SELF-ADAPTIVE SOFTWARE BACKGROUND UPDATE METHOD AND DEVICE

TECHNICAL FIELD

The present application relates to a technical field of network terminals, and in particular, to a self-adaptive software background update method and device.

BACKGROUND

At present, software update of intelligent terminals through the network has become the most commonly used software update method. The network update of software needs to download the updated software to the local intelligent terminal through the network. Generally, a system update software is large, and the download occupies a large bandwidth and a long time. When a user is watching a network video program, a large amount of network download bandwidth will be occupied if the system software is updated, and playing is probably stuck far an insufficient bandwidth, and the viewing of the program will be greatly affected. Therefore, some intelligent terminals, when update the network of system software, take the mode of that system resource is monopolized, and no other operations can be performed by the user, such as watching network video programs, during the process of downloading the update software.

SUMMARY

The main purpose of the present application is to provide a self-adaptive software background update method and device, aiming at providing a maximum network download bandwidth for downloading system update software and at improving user experience under the premise of smooth viewing of network video.

In order to achieve the above objective, the present application provides a software background self-adaptive network update method, which includes the following steps:

monitoring a TCP download request in a system, after the system starts up;

filtering a download request of a network video and a download request of a system update software from the TCP download request, when the download request of the network video and the download request of the system update software exist simultaneously in the TCP download request;

downloading and playing the network video under a TCP link according to the download request of the network video, and obtaining a data cache amount of the network video;

starting up downloading the system update software according to the download request of the system update software;

controlling a download rate of the system update software in the TCP link according to the data cache amount of the network video.

Preferably, the operation of downloading and playing the network video from a TCP link according to the download request of the network video includes:

requesting to download a video file of a program from a network video server through a TCP transmission protocol according to the download request of the network video and playing the video file.

Preferably, the operation of obtaining a data cache amount of the network video includes:

analyzing an application layer protocol of the TCP download request;

extracting a URL address of the TCP download request;

acquiring a video file downloaded from the TCP link, when a file name of the TCP download request in the URL address contains a suffix of the video file;

analyzing the video file to obtain the data cache amount of network video.

Preferably, the step of analyzing the video file to obtain the data cache amount of network video includes:

acquiring a playing display time PTS1 of a video data segment initially recorded in the video file and acquiring an associated system time T1, analyzing a code rate V1 of the video file;

acquiring a current time PTS of the video data segment of the video file and an associated system time T;

calculating a time duration D that a cached data can be played by a current player, wherein, $D=(PTS-PTS1)-(T-T1)$.

The network video is played smoothly if a time of an amount of the downloaded video data that can be played longer than a user's viewing time, when $D>0$.

The network video is played stuck and buffered if the time of the amount of the downloaded video data that can be played is less than the user's viewing time, when $D<0$.

Preferably, the operation of controlling a download rate of the system update software in the TCP link according to the data cache amount of the network video includes:

controlling the download rate of the system update software to zero, when $D<N1$, wherein N1 is a set value;

controlling the download rate of the system update software to V, when $N2>D>N1$, wherein $V=D/(2*V1)$ and N2 is a set value;

free-controlling the download rate of the system update software, when $D>N2$.

Preferably, N1 is set between 20 and 30 and N2 is set between 90 and 100.

The present application also provides a self-adaptive software background update device, which includes:

a network download monitoring module, configured to monitor a TCP download request in a system after the system starts up;

the network download monitoring module is further configured to filter a download request of a network video and a download request of a system update software from the TCP download request, when the download request of the network video and the download request of the system update software exist simultaneously in the TCP download request;

a network video playing module, configured to download and play the network video under a TCP link according to the download request of the network video;

a video file analyzing module, configured to obtain a data cache amount of network video accord to the TCP download request;

a system update module, configured to start up downloading the system update software according to the download request of the system update software;

a software download rate control module, configured to control a download rate of the system update software from the TCP link according to the data cache amount of the network video.

Preferably, the network video playing module, is further configured to request to download a video file of a program from a network video server through a TCP transmission protocol according to the download request of the network video and to play the video file.

Preferably, the video file analyzing module is also configured to analyze an application layer protocol of the TCP download request; to extract a URL address of the TCP download request; to acquire a video file downloaded from the TCP link, when a file name of the TCP download request in the URL address contains a suffix of the video file; and analyze the video file to obtain the data cache amount of network video.

Preferably, the video file analyzing module is further configured to acquire a playing display time PTS1 of a video data segment initially recorded in the video file and to acquire an associated system time T1, analyze a code rate V1 of the video file; to calculate a time duration D that a cached data can be played by a current player, wherein, D=(PTS−PTS1)−(T−T1).

The network video is played smoothly if a time of an amount of the downloaded video data that can be played longer than a user's viewing time, when D>0.

The network video is played stuck and buffered if the time of the amount of the downloaded video data that can be played is less than the user's viewing time, when D<0.

Preferably, the software download rate control module is specifically configured to:

control the download rate of the system update software to zero, when D<N1, wherein N1 is a set value;

control the download rate of the system update software to V, when N2>D>N1, wherein V=D/(2*V1) and N2 is a set value;

free-control the download rate of the system update software, when D>N2.

Preferably, N1 is set between 20 and 30 and N2 is set between 90 and 100.

The self-adaptive software background update method and device provided by the present application, obtains the TCP download request in the system after the system is started up, and filters a download request of a network video and a download request of a system update software from the TCP download request, and downloads and plays the network video under a TCP link according to the download request of the network video, and obtains a data cache amount of the network video, and controls a download rate of the system update software from the TCP link according to the download request of the system and the data cache amount of the network video. The maximum network download bandwidth that can be used for the download of the update software is provided under the premise of smooth viewing of the network video. The occupation is effectively solved of bandwidth resources by the network video playback and the software update, and the user experience is improved.

In order to achieve the objective, technical solution and advantages of the present application more clearly, the present application will be described in further detail thereafter with reference to the drawings and embodiments.

DETAILED DESCRIPTION OF THE EMBODIMENTS

It should be understood that the specific embodiments described herein are only for the purpose of explaining the present application and are not intended to limit the present application.

The main solution of the embodiment of the present application is: monitoring a TCP download request in a system, after the system starts up; filtering a download request of a network video and a download request of a system update software from the TCP download request, when the download request of the network video and the download request of the system update software exist simultaneously in the TCP download request; downloading and playing the network video under a TCP link according to the download request of the network video, and obtaining a data cache amount of the network video; starting up downloading the system update software according to the download request of the system update software; controlling a download rate of the system update software in the TCP link according to the data cache amount of the network video. As such, a maximum network download bandwidth is provided for software update under the premise of smooth viewing of the network video, effectively solves the occupation of bandwidth resources by the network video playback and the software update, and improves the user experience.

Considering that all the current network video playing and system update software downloads are based on the TCP transmission protocol. Therefore, the technical solution of the embodiments intercepts all TCP requests in the system kernel space, and filters out download requests of the network video and download requests of the system update software. After the download request of the network video and the download request of the system update software are detected at the same time, the download rate of the update software is controlled according to the smoothness of video playing and the amount of video data cache. In other cases, there is no rate control for downloading system update software. In this way, not only can the system software be updated without affecting the video viewing experience of the user, but also the problem that the user cannot perform any operation during the update process of the system software is effectively solved, and the user experience is improved.

Figure 1:
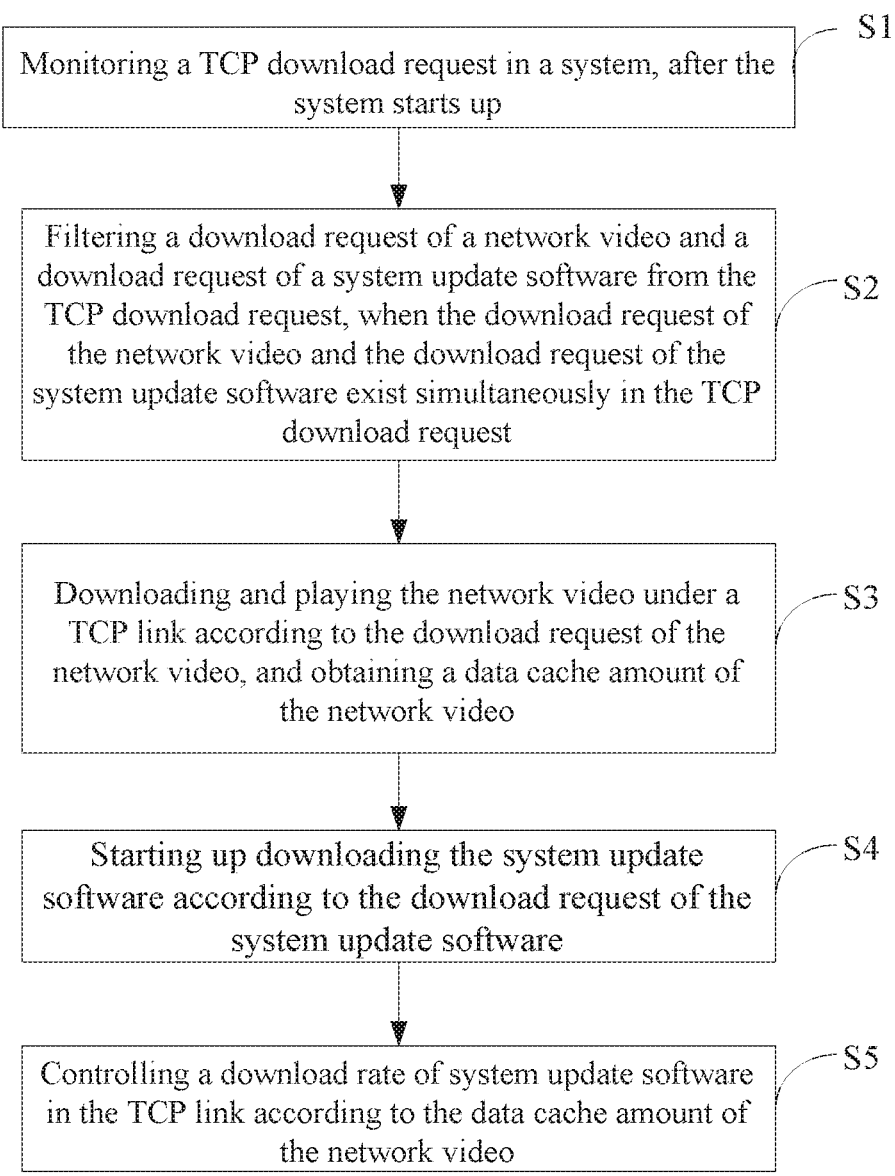
FIG. 1 is a flowchart of a first embodiment of the self-adaptive software background update method of the present application.

Specifically, referring to FIG. 1, the present application provides a self-adaptive software background update method. As a first embodiment of the present application, the method includes:

Step S1, monitoring a TCP download request in a system, after the system starts up;

in which, the system can be a network terminal system such as a television, a computer or a mobile phone, and this embodiment takes a television as an example.

In order to implement the solution of the embodiments of the present application, associated functional modules are provided in the television. For example, a network download monitoring module, a network video play module, a video file analyzing module, a system update module and a software download rate control module may be provided in the television.

After the TV system is turned on, the network download monitoring module is started up immediately to monitor all TCP download requests in the system.

The TV system sends different TCP download requests to the network server, and the TV network download monitoring module monitors different TCP download requests.

Step S2, filtering a download request of a network video and a download request of a system update software from the TCP download request, when the download request of the network video and the download request of the system update software exist simultaneously in the TCP download request.

When the television network download monitoring module monitors that the television system has sent the download request of the network video and the download request of the system update software to the network server, the television network download monitoring module filters the download request of a network video and the download request of a system update software from the TCP download request, in which, the network server may or may not be the same.

Step S3, downloading and playing the network video under a TCP link according to the download request of the network video, and obtaining a data cache amount of the network video.

After the TV network download monitoring module filters the download request of the network video from the TCP download request, the TV network video playing module downloads and plays the network video from the TCP link according to the download request of the network video.

Specifically, the network video playing module downloads a video file of a program from a network video server through a TCP transmission protocol according to the download request of the network video and to play the video file, during the process of requesting play of the video file by the user.

In the meanwhile, the television video analysis module analyzes the network video files to obtain the data cache amount of the network video.

Step S4, starting up downloading the system update software according to the download request of the system update software.

After the television network download monitoring module filters the download request of the network video from the TCP download request, the television network video playing module downloads and plays the network video from the TCP link according to the download request of the network video.

Step S5, controlling a download rate of the system update software in the TCP link according to the data cache amount of the network video.

After the television system update module starts the download of the system update software, the television software download rate control module controls the download rate of the system update software from the TCP link according to the data cache amount of the network video analyzed by the television video analysis module.

The main solution of the present application is implemented by: monitoring a TCP download request in a system, after the system starts up; filtering a download request of a network video and a download request of a system update software from the TCP download request, when the download request of the network video and the download request of the system update software exist simultaneously in the TCP download request; downloading and playing the network video under a TCP link according to the download request of the network video, and obtaining a data cache amount of the network video; starting up downloading the system update software according to the download request of the system update software; controlling a download rate of the system update software in the TCP link according to the data cache amount of the network video. A maximum network download bandwidth is provided for software update under the premise of smooth viewing of the network video, effectively solves the occupation of bandwidth resources by the network video playback and the software update, and improves the user experience.

Figure 2:
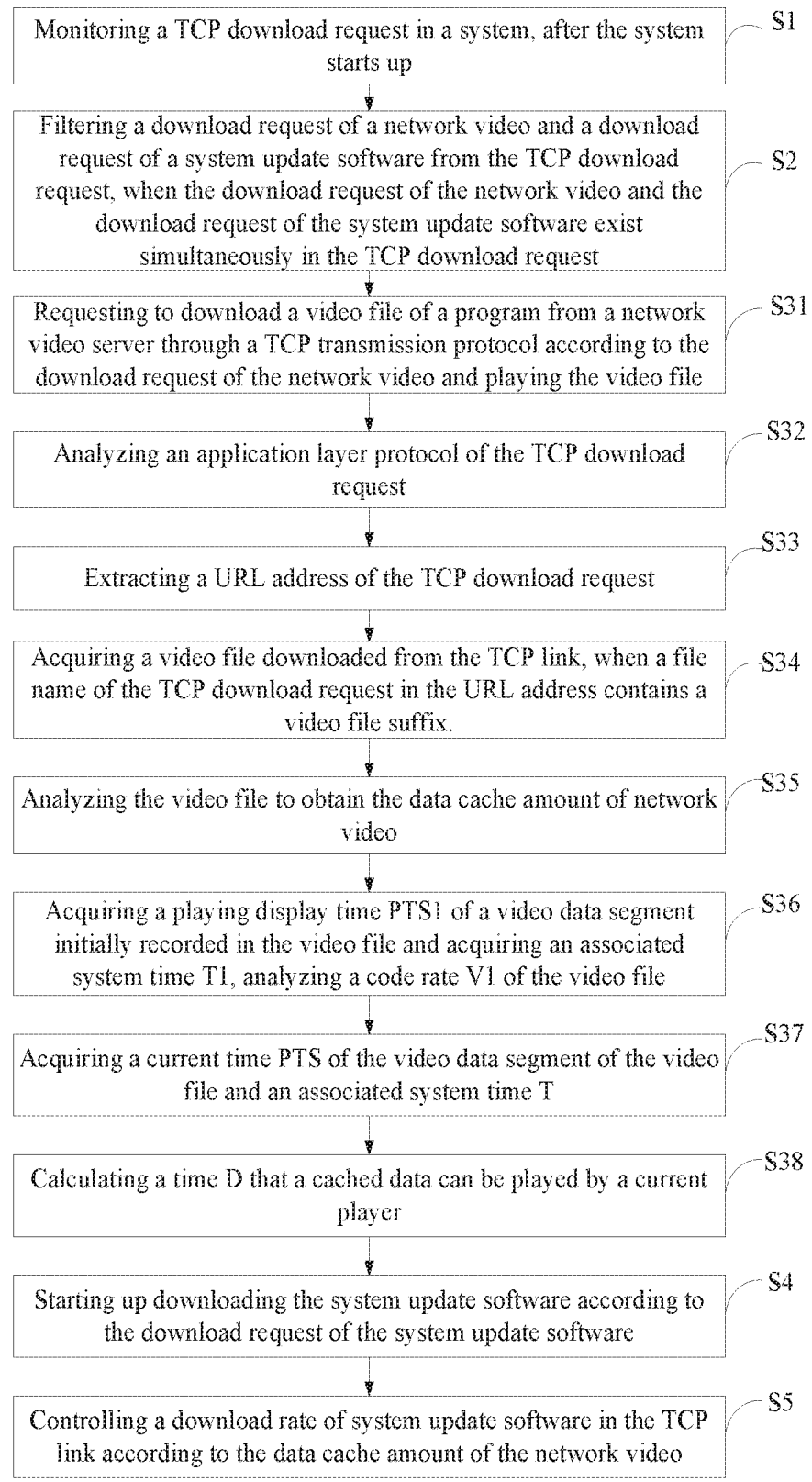
FIG. 2 is a flowchart of a second embodiment of the self-adaptive software background update method of the present application.

As a preferred embodiment of the present application, as shown in FIG. 2, the step S3 of downloading and playing the network video from a TCP link according to the download request of the network video may include:

Step S31, requesting to download a video file of a program from a network video server through a TCP transmission protocol according to the download request of the network video and playing the video file.

As a preferred embodiment of the present application, the operation of obtaining a data cache amount of the network video includes:

Step S32, analyzing an application layer protocol of the TCP download request.

Step S33, extracting a URL address of the TCP download request.

Step S34, acquiring a video file downloaded from the TCP link, when a file name of the TCP download request in the URL address contains a suffix of the video file.

Step S35, analyzing the video file to obtain the data cache amount of network video.

Specifically, in order to obtain the data cache amount of network video, the television video analysis module first analyzes the application layer protocol in the TCP download request, and then extracts the URL address of the TCP download request. When the television video analysis module finds that the file name of the TCP download request in the URL address contains the suffix of the video file, the video file downloaded by the TCP link is downloaded, and the video file is analyzed to obtain the data cache amount of network video.

More specifically, as shown in FIG. 2, the operation of analyzing the video file and obtaining the cache amount of the network video data may include:

Step S36, acquiring a playing display time PTS1 of a video data segment initially recorded in the video file and acquiring an associated system time T1, analyzing a code rate V1 of the video file.

Step S37, acquiring a current time PTS of the video data segment of the video file and an associated system time T.

Step S38, calculating a time duration D that cached data can be played by a current player, wherein, D=(PTS−PTS1)−(T−T1);

After the television video analysis module obtains the video file downloaded by TCP link, the playing display time PTS1 of the video data segment initially recorded in the video file and the associated system time T1 are acquired. And the code rate V1 of the video file is analyzed, and the current time PTS of the video file and the associated system time are obtained. Then the time duration D that a cached data can be played by a current player is calculated, in which, D=(PTS−PTS1)−(T−T1).

When D>0, implying that a time of an amount of the downloaded video data that can be played longer than a user's viewing time, and the network video is played smoothly.

When D<0, implying that the time of the amount of the downloaded video data that can be played is less than the user's viewing time, and the network video is played stuck and buffered.

When the network download monitoring module monitors the download request for the system update software in the TCP request, the system update module starts the download of the system update software according to the download request of the system update software, and starts the software download rate control module to control the download rate of the system update software according to the data cache amount of network video.

Specifically, when the television video analysis module calculates the time that the current player can play D<0, implying the current network video is stuck. In order to make the download of the system update software does not occupy the network bandwidth, the download rate is controlled to zero of the system update software, that is, the download of the system update software is temporarily stopped.

When N1>D>0, implying that the current video is playing smoothly, but the network condition is not good. The download rate of the system update software is controlled to zero, that is, the download of the system update software is temporarily stopped.

When N2>D>N1, it means that the current video is playing smoothly and the network is in good condition. The download rate of the system update software is controlled to v, in which V=D/(2*V1).

When D>N2, it means that the current video is playing smoothly and the network condition is very ideal, so the download rate of the system update software is not controlled.

In which, N1 and N2 can be set according to actual experience.

Specifically, in practice:

1. N1 is set between 20 and 30. When D<N1, there is not much data cached by the player, indicating that the user's home network is not ideal and the user's bandwidth is just enough for the user to watch the video. At this time, if the update software is downloaded in the background, the player's download bandwidth will be preempted. Since the player has less data cached, play is easy to get stuck.

2. N2 value is set between 90 and 100:

2.1 When N1<D<N2, the player caches a certain amount of video data starting the background download of the update software at this time will preempt the download bandwidth of the player. Since the download rate of the update software is controlled and the player has a certain amount of video data cache, the download of the update software will not affect the quality of video experience.

2.2 When D>N2, the player caches a large amount of video data at this time, indicating that the user's home network condition is very ideal. Even if the update software is downloaded at a full speed, the quality of the video experience will not be affected.

It should be noted that the network download monitoring module and the software download rate control module update the D value previously acquired after acquiring the amount of data cached by the player D, until the system update software download is completed, or the video download is completed or the video download link is disconnected.

To conclude, the aforementioned solution of the embodiment of the present application is implemented by: monitoring a TCP download request in a system, after the system starts up; filtering a download request of a network video and a download request of a system update software from the TCP download request, when the download request of the network video and the download request of the system update software exist simultaneously in the TCP download request; downloading and playing the network video under a TCP link according to the download request of the network video, and obtaining a data cache amount of the network video; starting up downloading the system update software according to the download request of the system update software; controlling a download rate of the system update software in the TCP link according to the data cache amount of the network video. A maximum network download bandwidth is provided for software update under the premise of smooth viewing of the network video, effectively solves the occupation of bandwidth resources by the network video playback and the software update, and improves the user experience.

Figure 3:
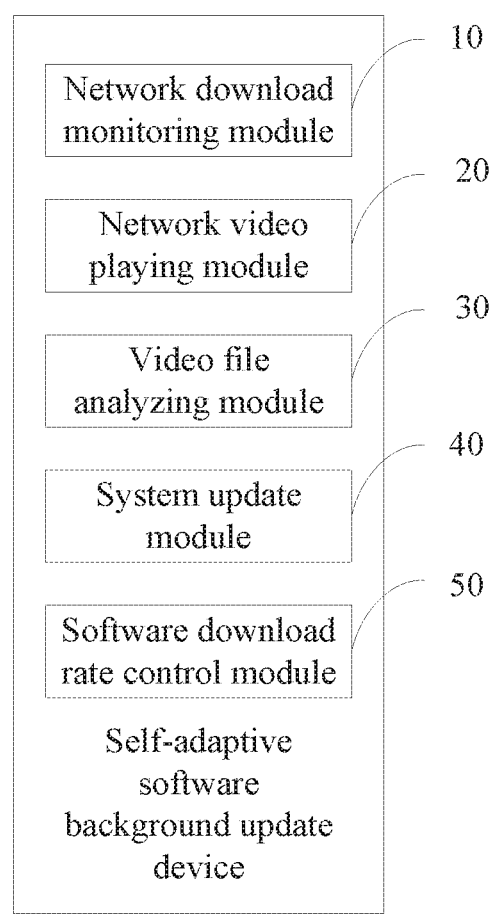
FIG. 3 is a functional module diagram of some preferred embodiments of the self-adaptive software background update device of the present application.

Based on the self-adaptive software background update method aforementioned, as shown in FIG. 3, the present application provides a self-adaptive software background update device associated with the self-adaptive software background update method. The device includes a network download monitoring module 10, a network video playing module 20, a video file analyzing module 30, a system update module 40 and a software download rate control module 50.

In which, the network download monitoring module 10 is configured to monitor TCP download requests in the system after the system is started up. In addition, it is further configured to filter a download request of a network video and a download request of a system update software from the TCP download request, when the download request of the network video and the download request of the system update software exist simultaneously in the TCP download request.

The network video playing module 20, is configured to download and play the network video under a TCP link according to the download request of the network video.

The video file analyzing module 30, is configured to obtain a data cache amount of network video accord to the TCP download request.

The system update module 40, is configured to start up downloading the system update software according to the download request of the system update software.

The software download rate control module 50, is configured to control a download rate of the system update software from the TCP link according to the data cache amount of the network video.

In which, the system can be a network terminal system such as a television, a computer or a mobile phone. The present embodiment takes the television as an example. After the television system is turned on, the television network download monitoring module 10 is immediately started to monitor the TCP download request in the system. When the television network download monitoring module 10 monitors that the television system has sent the download request of the network video and the download request of the system update software to the network server, the television network download monitoring module 10 filters the download request of a network video and the download request of a system update software from the TCP download request, in which, the network server may or may not be the same.

The television network video playing module 20 downloads and plays the network video from the TCP link according to the download request of the network video. Specifically, the television network video playing module 20 downloads a video file of a program from a network video server through a TCP transmission protocol according to the download request of the network video and to play the video file, during the process of requesting play of the video file by the user.

After the television network video playing module 20 obtains the network video file, the television video file analyzing module 30 analyzes the network video file to obtain the data cache amount of the network video. The television system update module 40 start up downloading the system update software according to the download request of the system update software. The software download rate control module 50 controls the download rate of the system update software from the TCP link according to the data cache amount of the network video.

The main solution of the present application lies in: the television network download monitoring module 10 monitors TCP download request in a system when the system starts up, and a download request of a network video and a download request of a system update software is filtered from the TCP download request, when the download request of the network video and the download request of the system update software exist simultaneously in the TCP download request, and the television network video playing module 20 downloads and plays the network video under a TCP link according to the download request of the network video, and the video file analyzing module 30 obtains the data cache amount of the network video, and system update module 40 starts up downloading the system update software according to the download request of the system update software, and the software download rate control module 50 controls a download rate of the system update software from the TCP link according to the data cache amount of the network video. A maximum network download bandwidth is provided for software update under the premise of smooth viewing of the network video, effectively solves the occupation of bandwidth resources by the network video playback and the software update, and improves the user experience.

As a preferred embodiment of the present application, after the television network download monitoring module 10 monitors the download request of the network video, the television network video playing module 20 requests to download a video file of a program from a network video server through a TCP transmission protocol according to the download request of the network video and plays the video file.

After the television network download monitoring module 10 monitors the download request of the network video, the television video file analyzing module 30 analyzes the application layer protocol of the TCP download request, extracts the URL address of the TCP download request according to the application layer protocol. When the file name of the TCP download request in the URL address contains the suffix of the video file, the video file downloaded by the TCP link is obtained and the video file is analyzed to obtain the data cache amount of network video.

Specifically, after the television video analysis module 30 analyzes the video file, the playing display time PTS1 of the video data segment initially recorded in the video file and the associated system time T1 are firstly acquired. And the code rate V1 of the video file is analyzed, and the current time PTS of the video file and the associated system time T are obtained. Then the time duration D that a cached data can be played by a current player is calculated, in which, D=(PTS−PTS1)−(T−T1).

When D<0, implying that a time of an amount of the downloaded video data that can be played longer than a user's viewing time, and the network video is played smoothly.

When D<0, implying that the time of the amount of the downloaded video data that can be played is less than the user's viewing time, and the network video is played stuck and buffered.

After the television network download monitoring module 10 monitors the simultaneous existence of the download request of the network video and the download request of the system update software, the television software download rate control module 50 is started to control the download rate of the system update software according to the data cache amount of network video.

Specifically, when the television video analysis module calculates the time that the current player can play D<0, implying the current network video is stuck in order to make the download of the system update software does not occupy the network bandwidth, the download rate is controlled to zero of the system update software, that is, the download of the system update software is temporarily stopped.

When N1>D>0, implying that the current video is playing smoothly, but the network condition is not good. The download rate of the system update software is controlled to zero, that is, the download of the system update software is temporarily stopped.

When N2>D>N1, it means that the current video is playing smoothly and the network is in good condition. The download rate of the system update software is controlled to V in which V=D/(2*V1).

When D>N2, it means that the current video is playing smoothly and the network condition is very ideal, so the download rate of the system update software is not controlled.

In which, N1 and N2 can be set according to actual experience.

Specifically, in practice:

1. N1 is set between 20 and 30. When there is not much data cached by the player, indicating that the user's home network is not ideal and the user's bandwidth is just enough for the user to watch the video. At this time, if the update software is downloaded in the background, the player's download bandwidth will be preempted. Since the player has less data cached, play is easy to get stuck.

2, N2 value is set between 90 and 100:

2.1 When N1<D<N2, the player caches a certain amount of video data starting the background download of the update software at this time will preempt the download bandwidth of the player. Since the download rate of the update software is controlled and the player has a certain amount of video data cache, the download of the update software will not affect the quality of video experience.

2.2 When D>N2, the player caches a large amount of video data at this time, indicating that the user's home network condition is very ideal. Even if the update software is downloaded at a full speed, the quality of the video experience will not be affected.

To conclude, the present application monitors the TCP download request in the system when the system is started up through the network download monitoring module 10, and filters the network video download request and the system update software download request from the TCP download request when both the network video download request and the system update software download request exist in the TCP download request. The network video playing module 20 downloads and plays the network video on the TCP link according to the download request of the network video. The video file analyzing module 30 obtains the data cache amount of network video according to the TCP download request. The system update module 40 starts the download of the system update software according to the download request of the system update software. The software download rate control module 50 controls the download rate of the system update software in the TCP link according to the video data buffer amount, thus providing the maximum network download bandwidth that can be used for the download of the update software under the condition of ensuring the smooth viewing of the network video, effectively solving the problem that the network video playback and the update software download occupy bandwidth resources and improving the user experience. A maximum network download bandwidth is provided for software update under the premise of smooth viewing of the network video, effectively solves the occupation of bandwidth resources by the network video playback and the software update, and improves the user experience.

The above is only the preferred embodiment of the present application and is not therefore limiting the scope of the present application. Any equivalent structure or process change made by using the contents of the present specification and drawings, or directly or indirectly applied in other related technical fields, shall be included in the protection scope of the present application.

What is claimed is:

1. A self-adaptive software background update method, comprising:
    monitoring a TCP download request in a system, after the system starts up;
    the TCP download request including download request of the network video and the download request of the system update software exist simultaneously in the system;
    filtering a download request of a network video and a download request of a system update software from the TCP download request;
    downloading and playing the network video under a TCP link according to the download request of the network video, and obtaining a data cache amount of the network video;
    starting up a download of the system update software according to the download request of the system update software; and
    controlling a download rate of the system update software in the TCP link according to the data cache amount of the network video,
    acquiring a playing display time PTS1 of a video data segment initially recorded in a video file and acquiring an associated system time T1, to analyze a code rate V1 of the video file;
    acquiring a current time PTS of a video data of the video file and an associated system time T, wherein the video data comprises a plurality of the video data segments;
    calculating a time duration ID that a current player cached data can play, wherein, D=(PTS−PTS1)−(T−T1), and
    the operation of controlling a download rate of the system update software in the TCP link according to the data cache amount of the network video comprises:
    controlling the download rate of the system update software to zero, when D<N1, wherein N1 is a set value;
    controlling the download rate of the system update software to V, when N>D>N1, wherein, V=D/(2*V1) and N2 is a set value, and automatically implementing software update on the background; and
    free-controlling the download rate of the system update software, and automatically implementing software update on the background, when D>N2.

2. The method of claim 1, wherein, the operation of downloading and playing the network video under a TCP link according to the download request of the network video comprises:
    requesting to download a video file of a program from a network video server through a TCP transmission protocol according to the download request of the network video and playing the video file.

3. The method of claim 1, wherein, N1 is set between 20 and 30, and N2 is set between 90 and 100.

4. A self-adaptive software background update device, comprising:
    a processor and a memory storing one or more programs including instructions that, when executed by the processor, cause the device to:
    monitor a TCP download request in a system after the system starts up;
    the TCP download request including download request of the network video and the download request of the system update software exist simultaneously in the system;
    filter a download request of a network video and a download request of a system update software from the TCP download request;
    download and play the network video under a TCP link according to the download request of the network video;
    obtain a data cache amount of network video according to the TCP download request;
    start up a download of the system update software according to the download request of the system update software; and
    control a download rate of the system update software in the TCP link according to the data cache amount of the network video, wherein execution of the instructions cause the device to further: acquire a playing display time PTS1 of a video data segment initially recorded in a video file and to acquire an associated system time T1, to analyze a code rate V1 of the video file; to acquire a current time PTS of a video data of the video file and an associated system time T, wherein the video data comprises a plurality of the video data segments;
    calculate a time duration D that a cached data can be played by a current player, wherein, D=(PTS−PTS1)−(T−T1), and
    the execution of the instructions cause the device to further:
    control the download rate of the system update software to zero, when D<N1, wherein N1 is a set value;
    control the download rate of the system update software to V, when N2>D>N1, wherein V=D/(2*V1) and N2 is a set value, and automatically implement software update on the background; and
    free-control the download rate of the system update software, and automatically implement software update on the background, when D>N2.

5. The self-adaptive software background update device of claim 4, wherein, N1 is set between 20 and 30, and N2 is set between 90 and 100.

* * * * *